United States Patent
Toyoshima et al.

(10) Patent No.: US 12,479,705 B2
(45) Date of Patent: Nov. 25, 2025

(54) TRANSPORT ROBOT

(71) Applicant: TOYOTA JIDOSHA KABUSHIKI KAISHA, Toyota (JP)

(72) Inventors: Satoshi Toyoshima, Okazaki (JP); Daiki Fukunaga, Toyota (JP); Shiro Oda, Anjo (JP); Nobuyuki Tomatsu, Nagoya (JP); Keisuke Fukunaga, Chofu (JP); Zixun Mei, Tokyo (JP); Takeshi Matsui, Nissin (JP); Toshiyuki Kawabe, Toyohashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 387 days.

(21) Appl. No.: 17/984,337

(22) Filed: Nov. 10, 2022

(65) Prior Publication Data
US 2023/0202814 A1    Jun. 29, 2023

(30) Foreign Application Priority Data
Dec. 28, 2021   (JP) ................................. 2021-214799

(51) Int. Cl.
*B66F 9/07* (2006.01)
*B25J 5/00* (2006.01)
*B66F 9/06* (2006.01)
*B66F 9/075* (2006.01)

(52) U.S. Cl.
CPC .......... *B66F 9/07513* (2013.01); *B66F 9/063* (2013.01); *B25J 5/007* (2013.01)

(58) Field of Classification Search
CPC ........ B66F 9/07513; B66F 9/063; B25J 5/007
See application file for complete search history.

(56) References Cited

U.S. PATENT DOCUMENTS

| | | | | |
|---|---|---|---|---|
| 4,137,984 | A * | 2/1979 | Jennings | B62D 1/28 180/274 |
| 8,056,162 | B2 * | 11/2011 | Newkirk | A61G 12/004 180/11 |
| 8,634,981 | B1 * | 1/2014 | Hyde | A61G 1/0275 180/19.1 |
| 9,278,840 | B2 * | 3/2016 | Hess | G05D 1/021 |
| 9,707,143 | B2 * | 7/2017 | Thodupunuri | A61G 7/018 |
| 9,824,328 | B2 * | 11/2017 | Lecky | G06Q 10/087 |
| 10,754,466 | B2 * | 8/2020 | Ochenas | B66F 9/24 |
| 10,773,935 | B2 * | 9/2020 | Yamamoto | B66F 7/0625 |
| 10,921,819 | B2 * | 2/2021 | Brucker | G05D 1/0244 |

(Continued)

FOREIGN PATENT DOCUMENTS

| | | |
|---|---|---|
| CN | 102633077 A | 8/2012 |
| CN | 207434322 U | 6/2018 |

(Continued)

*Primary Examiner* — Saul Rodriguez
*Assistant Examiner* — Ashley K Romano
(74) *Attorney, Agent, or Firm* — Dinsmore & Shohl LLP

(57) ABSTRACT

A transport robot is configured to transfer a transported article to and from an installed shelf by passing the installed shelf. A shelf portion that holds the transported article is configured to pass the installed shelf by the transport robot traveling. A chassis is configured to support the shelf portion. A stand is disposed on a first end portion side in a right-left direction of the transport robot, and extends upward from the chassis. An operating unit is configured to be installed on the stand.

20 Claims, 10 Drawing Sheets

(56) References Cited

U.S. PATENT DOCUMENTS

| | | | |
|---|---|---|---|
| 11,294,393 B2* | 4/2022 | Thode | G05D 1/0274 |
| 11,420,856 B2* | 8/2022 | Ranjan | B60P 1/02 |
| 11,501,794 B1* | 11/2022 | Kim | G10L 15/1815 |
| 11,780,718 B2* | 10/2023 | Ghirardi | B66F 9/065 254/7 C |
| 11,807,400 B1* | 11/2023 | Voiss | B25J 9/1694 |
| 12,032,387 B2* | 7/2024 | Oda | G05D 1/0297 |
| 12,157,658 B2* | 12/2024 | Takao | B66F 9/063 |
| 2007/0288123 A1* | 12/2007 | D'Andrea | G05D 1/021 700/214 |
| 2013/0302132 A1* | 11/2013 | D'Andrea | G06Q 10/087 414/807 |
| 2014/0228999 A1* | 8/2014 | D'Andrea | G06Q 10/087 700/214 |
| 2016/0090285 A1* | 3/2016 | Svensson | G05D 1/0246 700/300 |
| 2019/0169007 A1* | 6/2019 | Standard | B62B 5/0053 |
| 2019/0271990 A1* | 9/2019 | Grabbe | G05D 1/0297 |
| 2019/0287405 A1* | 9/2019 | Lewandowski | F16P 3/147 |
| 2020/0109038 A1* | 4/2020 | Nagasawa | G06T 7/70 |
| 2020/0255235 A1* | 8/2020 | Ruhland | B66F 9/0755 |
| 2020/0339350 A1* | 10/2020 | Dooley | B65G 65/02 |
| 2021/0275117 A1* | 9/2021 | De Boer | A61B 6/462 |
| 2021/0323767 A1 | 10/2021 | Liu et al. | |
| 2021/0339393 A1 | 11/2021 | Airobot | |
| 2022/0108613 A1* | 4/2022 | Estep | G05D 1/0289 |
| 2022/0250239 A1* | 8/2022 | Iwamoto | B25J 5/007 |
| 2022/0332526 A1* | 10/2022 | Xu | B66F 9/063 |
| 2022/0363528 A1* | 11/2022 | Okamoto | B66F 9/0759 |
| 2022/0371821 A1* | 11/2022 | Cheng | B65G 1/0435 |
| 2022/0390955 A1* | 12/2022 | McLachlan | B66F 9/07568 |
| 2022/0396441 A1* | 12/2022 | Möllmann | B66F 9/063 |
| 2023/0001570 A1* | 1/2023 | Fox | B25J 11/008 |
| 2023/0069056 A1* | 3/2023 | Zahdeh | B66F 9/063 |
| 2023/0135834 A1* | 5/2023 | Keller | B66F 9/063 414/619 |
| 2023/0294313 A1* | 9/2023 | Pryor | G01N 29/265 |
| 2023/0302633 A1* | 9/2023 | Hart | B65G 47/915 |
| 2023/0341873 A1* | 10/2023 | Paik | B25J 9/0084 |
| 2024/0184298 A1* | 6/2024 | Crawley | G05D 1/0248 |
| 2024/0329659 A1* | 10/2024 | Böhler | G05D 1/667 |
| 2024/0336463 A1* | 10/2024 | Finley | B66F 9/07581 |
| 2024/0391100 A1* | 11/2024 | Gray | B25J 9/0093 |

FOREIGN PATENT DOCUMENTS

| | | |
|---|---|---|
| CN | 111620024 A | 9/2020 |
| JP | 2021-517076 A | 7/2021 |

* cited by examiner

TRANSPORT ROBOT

CROSS-REFERENCE TO RELATED APPLICATION

This application claims priority to Japanese Patent Application No. 2021-214799 filed on Dec. 28, 2021, incorporated herein by reference in its entirety.

BACKGROUND

1. Technical Field

The present disclosure relates to a transport robot.

2. Description of Related Art

Japanese Unexamined Patent Application Publication (Translation of PCT Application) No. 2021-517076 discloses an autonomous transport robot. This autonomous transport robot has a robot arm that performs lading and unlading of objects (transported articles). The robot arm places the objects on a plate-like loading member.

SUMMARY

When transporting goods by such a robot, efficiently transferring (lading or unlading) the goods is desirable. That is to say, improving transportation efficiency by transferring transported articles in a convenient way is desirable.

A transport robot according to the present disclosure is configured to transfer transported articles to and from an installed shelf by passing the installed shelf. The transport robot includes a shelf portion, a chassis, a stand, and an operating unit. The shelf portion is configured to hold the transported article and is configured to pass the installed shelf by the transport robot traveling. The chassis is configured to support the shelf portion. The stand is disposed on a first end portion side in a right-left direction of the transport robot, and extends upward from the chassis. The operating unit is configured to be installed on the stand.

In the transport robot described above, the chassis may be provided with a lift stage that is configured to ascend and descend. The stand may be disposed on an outer side from the lift stage.

In the transport robot described above, the operating unit may be a touch panel monitor attached to the stand. The touch panel monitor may extend from the stand toward a second end portion side of the transport robot in the right-left direction.

In the transport robot described above, the shelf portion may be configured to be detachable from the chassis.

In the transport robot described above, an upper face of a lift stage may be configured to serve as a placing face on which a wagon is placed, when in a state in which the shelf portion is removed from the chassis.

In the transport robot described above, the shelf portion may include a base plate, a frame, and a rack. The base plate may be configured to be detachably fixed to the chassis. The frame may be disposed on the first end portion side in the right-left direction of the transport robot, and extend upward from the base plate. The rack may be supported by the frame, and extend from the frame toward a second end portion side of the transport robot in the right-left direction.

The transport robot may further include a transfer mechanism provided to the shelf portion. The transfer mechanism may be a rod member extending in the right-left direction of the transport robot. When the transport robot passes the installed shelf, the transfer mechanism may be configured to be brought into contact with the transported article such that the transported article is transferred between the transport robot and the installed shelf.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The present disclosure will be described below by way of an embodiment, but it should be noted that the present disclosure is not limited to the following embodiment. Not all of the configurations described in the embodiment are necessary for solving the problem.

Figure 1:
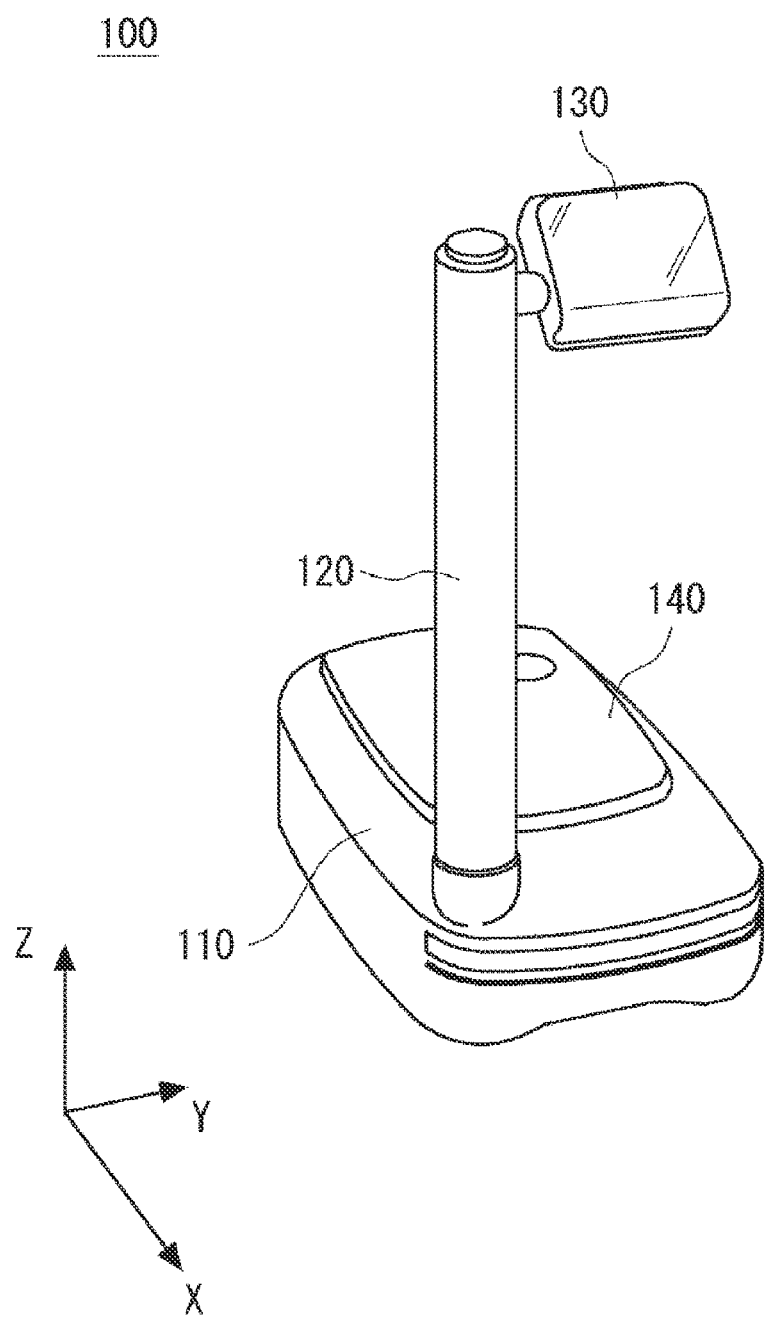
FIG. 1 is a perspective view illustrating an overall configuration of a transport robot according to an embodiment.

FIG. 1 is a perspective view illustrating an overall configuration of a transport robot 100 according to the present embodiment. In the following description, an XYZ orthogonal coordinate system will be used as appropriate. In this case, an X direction is a front-rear direction of the transport robot 100, a Y direction is a right-left direction, and a Z direction is a vertical up-down direction. More specifically, a +X direction is a forward direction of the transport robot 100 and a −X direction is a rearward direction of the transport robot 100. A +Y direction is a leftward direction of the transport robot 100, and a −Y direction is a rightward direction of the transport robot 100. A +Z direction is a vertically upward direction, and a −Z direction is a vertically downward direction.

Note that the transport robot 100 can move both in the forward direction and the rearward direction. That is to say, forward rotation of wheels 111 (FIGS. 2 to 7) moves the transport robot 100 in the forward direction, and reverse rotation thereof moves the transport robot 100 in the rearward direction. Changing the rotation speed of the right and left wheels 111 enables the transport robot 100 to turn right or left.

The transport robot 100 includes a chassis 110, a stand 120, and an operating unit 130. The chassis 110 is equipped with the wheels 111 (omitted from illustration in FIG. 1), axles, a battery, a control computer, a drive motor, and so forth. The chassis 110 holds the wheels 111 in such a manner that the wheels are rotatable. Furthermore, the chassis 110 may be provided with various types of sensors, such as a camera and a ranging sensor, and so forth. Description will be made here assuming that the transport robot 100 is an autonomous mobile robot. Of course, the transport robot 100 may be a mobile robot that moves in accordance with user operations.

Figure 2:
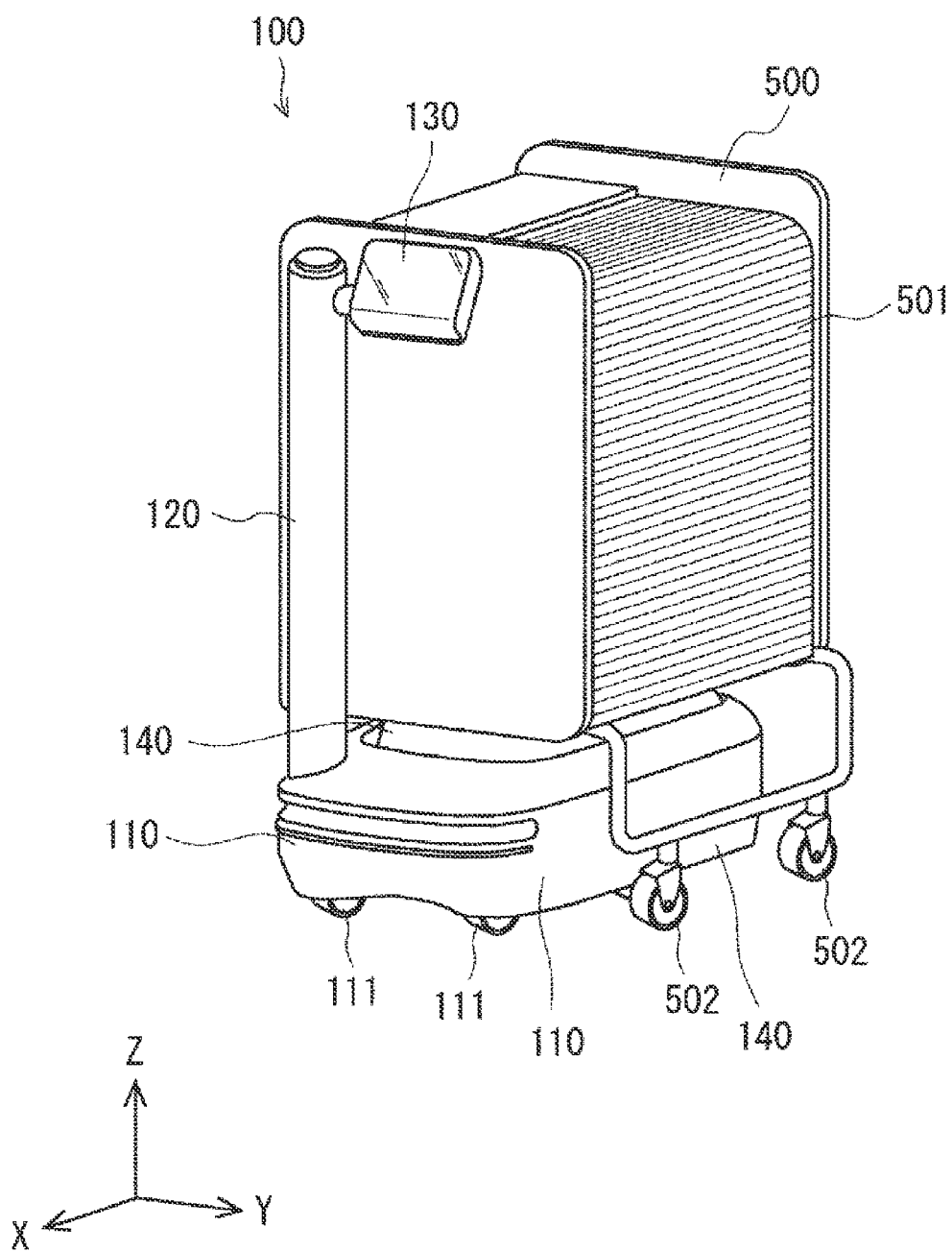
FIG. 2 is a perspective view illustrating a configuration of the transport robot transporting a wagon.
Figure 3:
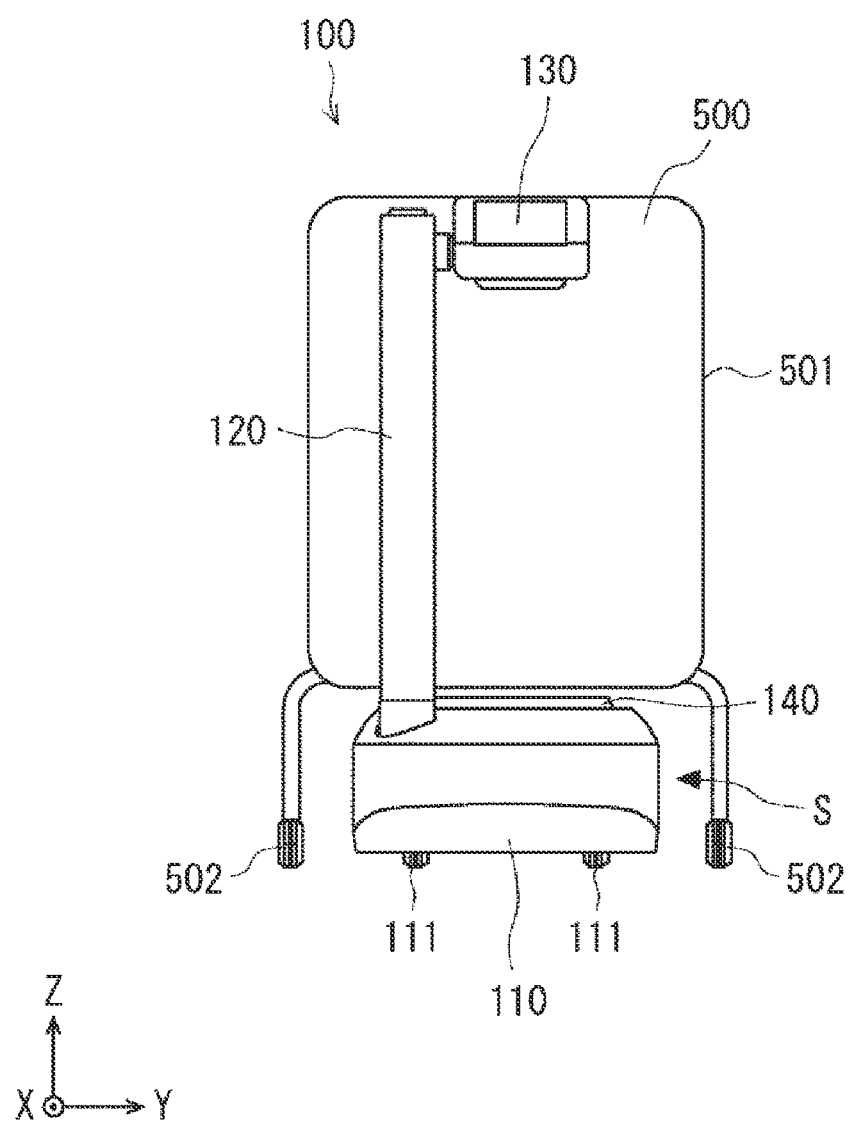
FIG. 3 is a front view illustrating the configuration of the transport robot transporting the wagon.
Figure 4:
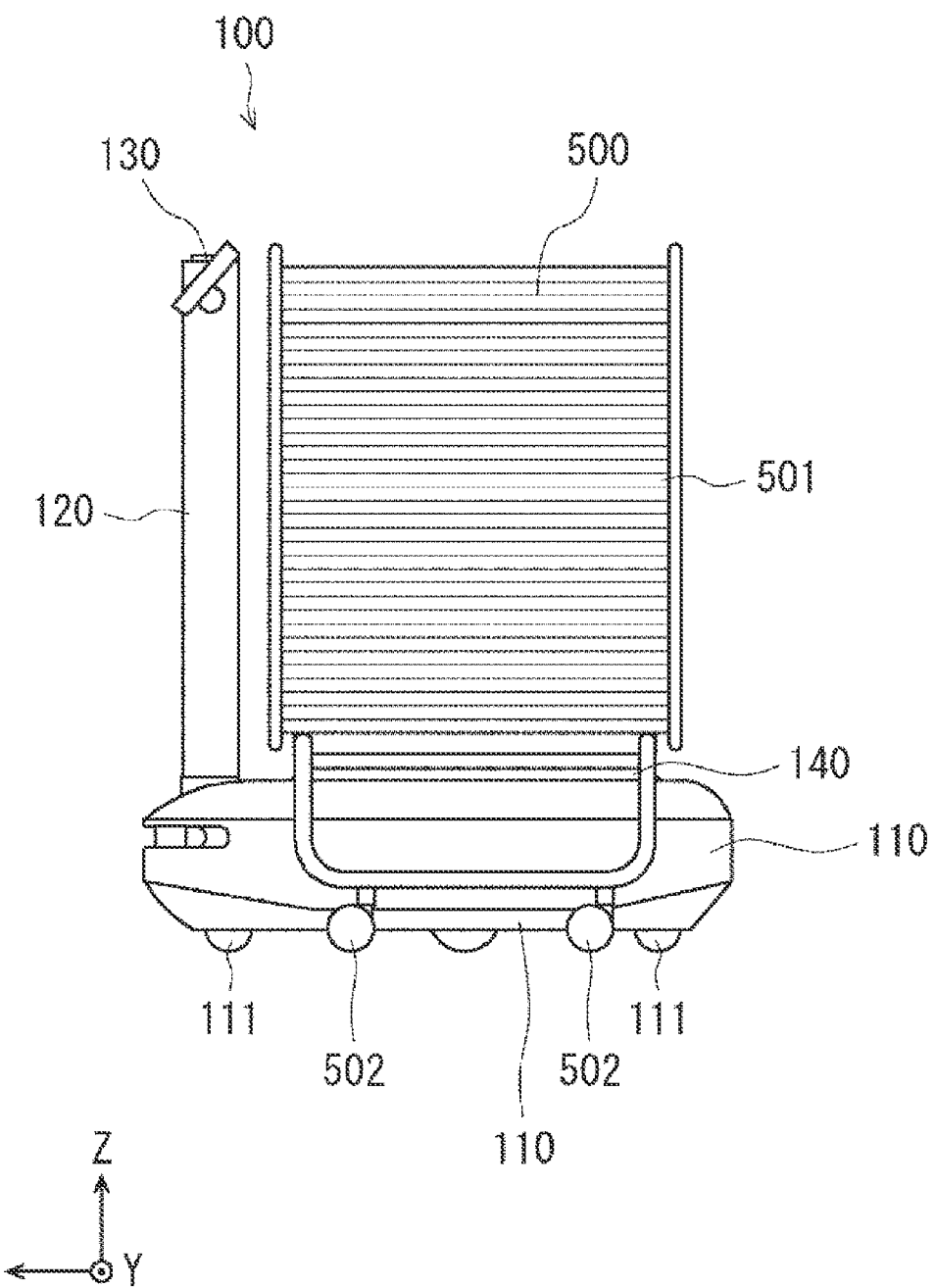
FIG. 4 is a side view illustrating the configuration of the transport robot transporting the wagon.
Figure 5:
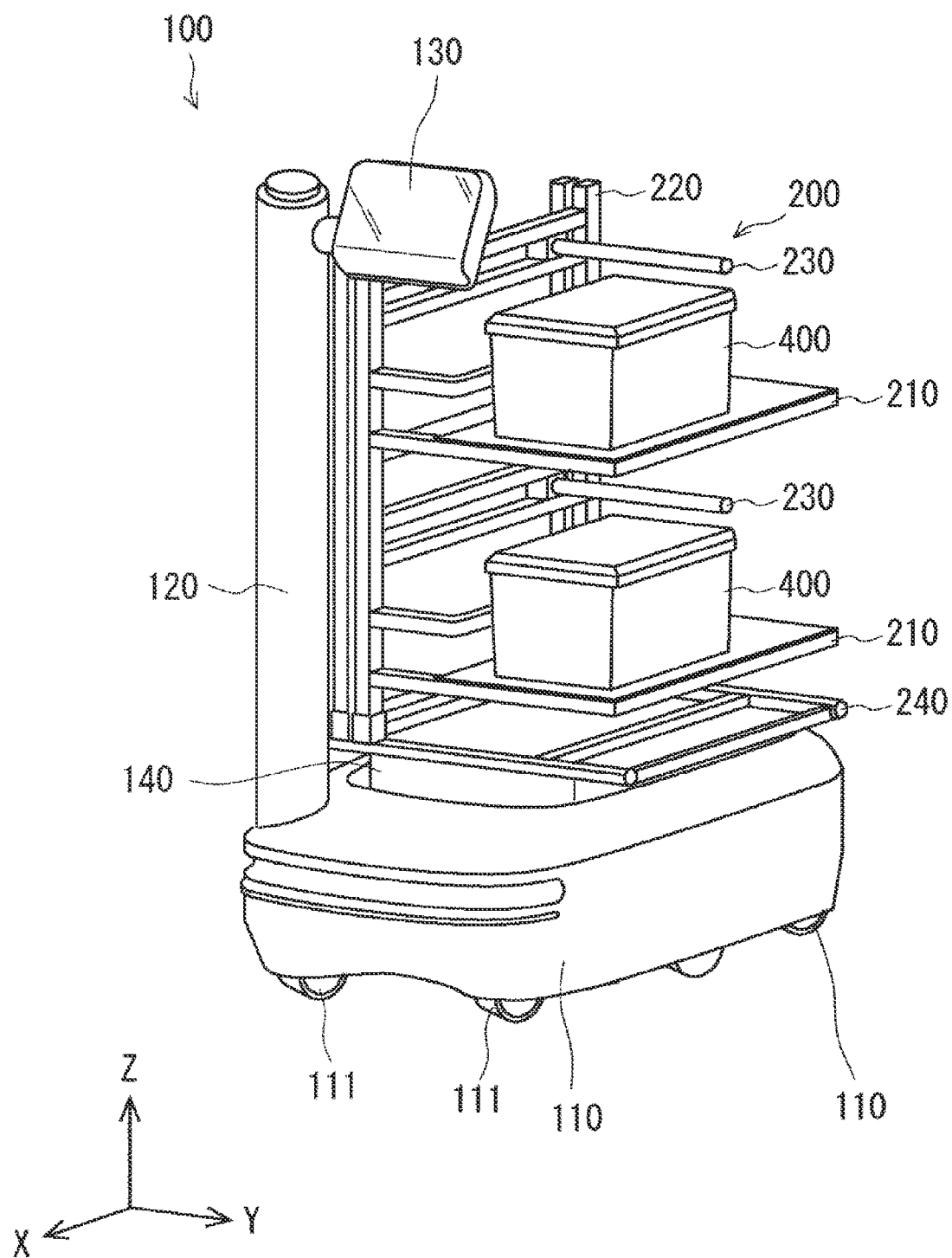
FIG. 5 is a perspective view illustrating a configuration of the transport robot in a state fitted with a shelf portion.

The chassis 110 accommodates a lift mechanism 140 for lading and unlading transported articles 400 (FIG. 5). The lift mechanism 140 is disposed on an upper face side of the chassis 110. The lift mechanism 140 is a lift stage, provided to be capable of ascending and descending. The chassis 110 is provided with a lift motor and a guide mechanism. An upper face of the lift mechanism 140 serves as a placing face for placing a wagon 500 (FIGS. 2 to 4). The lift mechanism 140 has a lift mechanism for lifting the wagon 500. Space above the lift mechanism 140 serves as a loading space for loading the transported articles 400.

The stand 120 is attached to the chassis 110. The stand 120 is a rod-like member extending upward from the chassis 110. Here, the stand 120 is formed in a cylindrical shape, with the Z direction as the longitudinal direction. The longitudinal direction of the stand 120 is provided parallel to the Z direction. The stand 120 is disposed on an outer side from the lift mechanism 140. That is to say, the stand 120 is disposed so as not to interfere with lifting operations of the lift mechanism 140. The stand 120 is disposed on a first end portion side in the Y direction (right-left direction) of the chassis 110 (transport robot 100). The stand 120 is attached in the proximity of the right front corner of the chassis 110. The stand 120 is provided at the end portion of the chassis 110 on the +X side and the −Y side on an XY plane.

The stand 120 supports the operating unit 130. The operating unit 130 is attached in the proximity of an upper end of the stand 120. Thus, the operating unit 130 can be installed at a height at which a user can easily operate. That is to say, the stand 120 extends from the chassis 110 to a height at which a user, in a state of standing, can easily operate. The operating unit 130 extends to the +Y side from the stand 120. In other words, the operating unit 130 extends from the stand 120 toward a second end portion side in the right-left direction of the chassis 110 (transport robot 100). The operating unit 130 is disposed at a middle of the chassis 110 in the right-left direction.

The operating unit 130 has a touch panel monitor or the like that receives user operations. The operating unit 130 may also have a microphone or the like for audio input, as a matter of course. The monitor of the operating unit 130 faces away from the chassis 110. That is to say, a display face (operating face) of the operating unit 130 is a face on the +X side. The operating unit 130 may be provided so as to be detachable from the stand 120. That is to say, a holder that holds the touch panel may be attached to the stand 120. The user can input transport destinations of the transported articles 400, transporting information about the transported article 400, and so forth, by operating the operating unit 130. Further, the operating unit 130 can display contents about the transported articles 400 being transported and the transported articles 400 scheduled to be transported, information about destinations to which the transported articles 400 are to be transported, and so forth, to the user.

A user stores a transported article 400 in the wagon 500 placed on the transport robot 100, and requests transportation thereof. The transport robot 100 autonomously travels to the destination that has been set, and thus transports the transported article 400. That is to say, the transport robot 100 executes a transportation task of goods (hereinafter, also referred to simply as "task"). In the following description, the location at which the transported article 400 is loaded will also be referred to as "transport origin" or "site of lading", and the location to which the transported article 400 is delivered will also be referred to as "transport destination" or "destination".

In one exemplary assumption, the transport robot 100 travels within a general hospital that has a plurality of clinical departments. The transport robot 100 transports accessories, consumables, medical equipment, and so forth, among the clinical departments. For example, the transport robot 100 delivers a transported article 400 from a nurses' station of one clinical department to a nurses' station of another clinical department. Alternatively, the transport robot 100 delivers a transported article 400 from a storeroom for accessories and medical equipment to a nurses' station of a clinical department. The transport robot 100 also delivers medications dispensed at a pharmaceutical department to a clinical department or patients scheduled to use the medications.

Examples of the transported articles 400 include medications, consumables such as bandages, specimens, examination instruments, medical equipment, hospital food, accessories such as stationery items, and so forth. Examples of medical equipment includes sphygmomanometers, blood transfusion pumps, syringe pumps, foot pumps, nurse call buttons, bed departure sensors, low-pressure continuous inhalers, electrocardiogram monitors, drug injection controllers, enteral nutrition pumps, artificial respirators, cuff pressure gauges, touch sensors, aspirators, nebulizers, pulse oximeters, artificial resuscitators, aseptic devices, echo machines, and so forth. Meals such as hospital food and examination meals may also be transported. Further, the transport robot 100 may transport used equipment, used tableware after meals, and so forth. When the transport destination is on a different floor, the transport robot 100 may travel using an elevator or the like.

Figure 6:
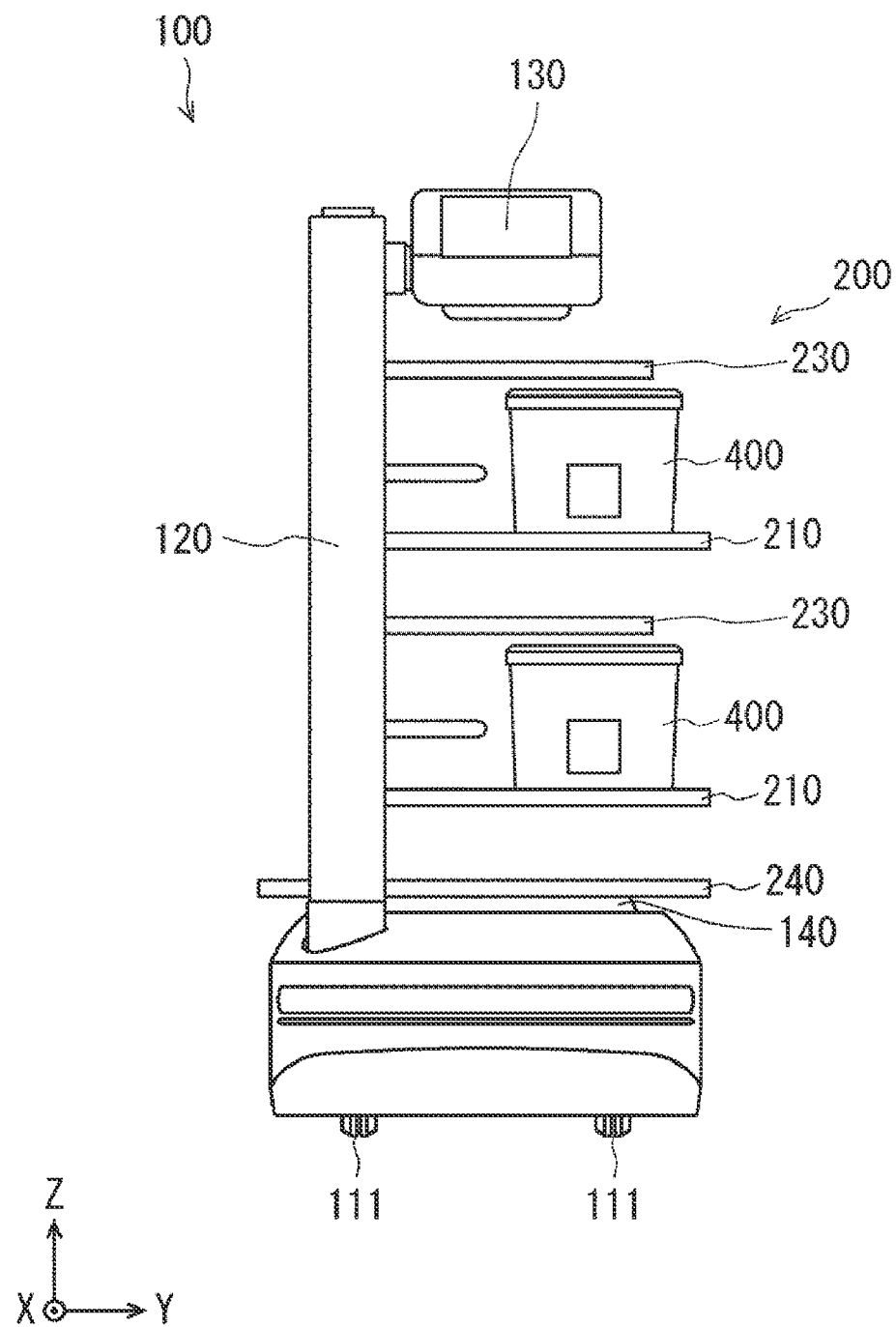
FIG. 6 is a front view illustrating the configuration of the transport robot in the state fitted with the shelf portion.
Figure 7:
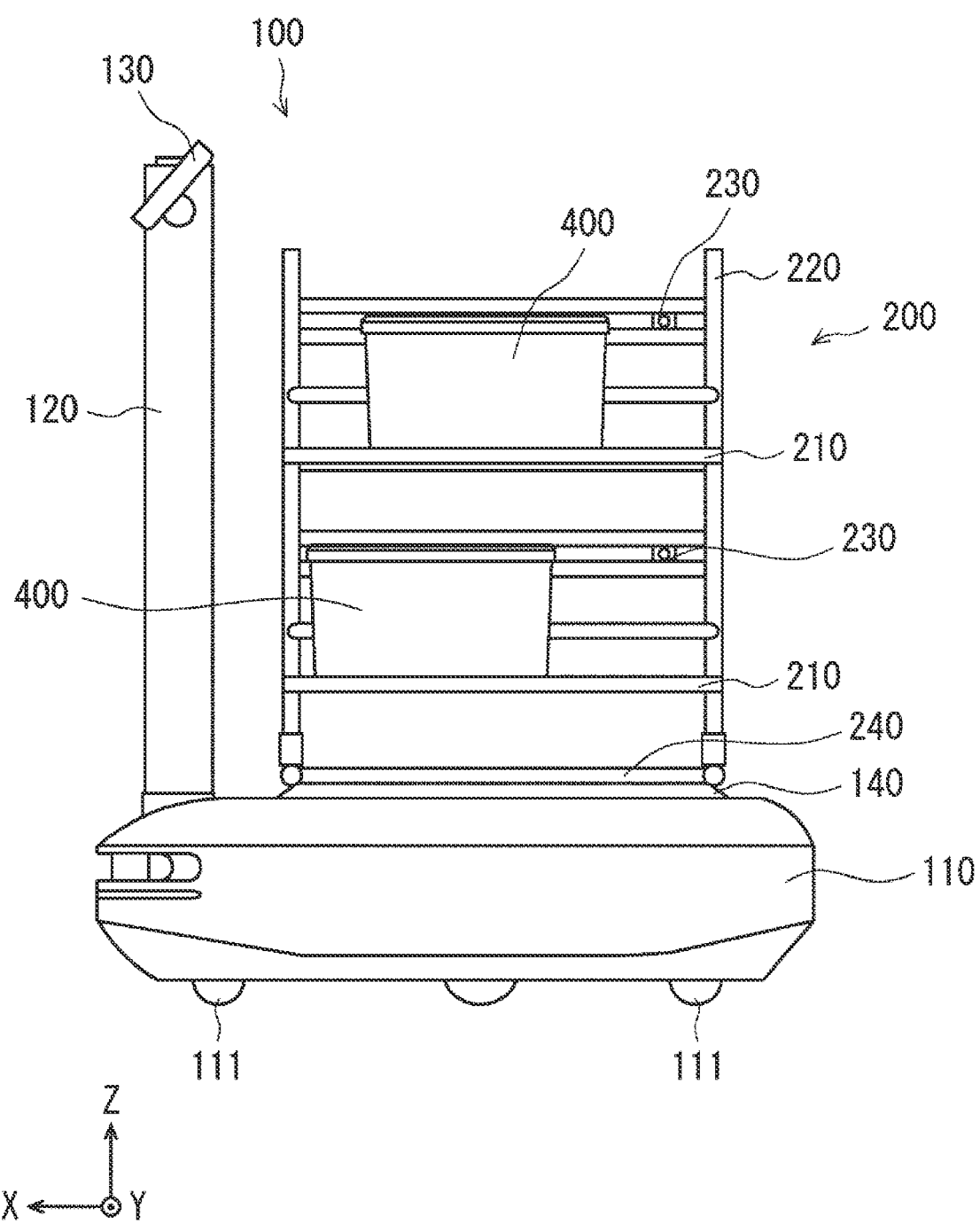
FIG. 7 is a side view illustrating the configuration of the transport robot in the state fitted with the shelf portion.

As illustrated in FIGS. 2 to 4, the transport robot 100 can hold the wagon 500 by the lift mechanism 140. The wagon 500 accommodates transported articles 400. Further, as illustrated in FIGS. 5 to 7, the transport robot 100 can transport transported articles 400 without using the wagon 500. In the state illustrated in FIGS. 5 to 7, a shelf portion 200 for transferring is fixed to the chassis 110. The state illustrated in FIGS. 2 to 4 is referred to as a "first mode" or a "wagon mode", and the state illustrated in FIGS. 5 to 7 is referred to as a "second mode" or a "shelf mode".

In the shelf mode, the shelf portion 200 is fixed to the chassis 110. The mode is changed to the wagon mode by removing the shelf portion 200 from the chassis 110. The mode is changed to the shelf mode by attaching the shelf portion 200 to the chassis 110. In other words, the shelf portion 200 serves as transfer shelves detachably provided on the chassis 110.

Wagon Mode

The wagon mode will be described with reference to FIGS. 2 to 4. A space S into which the chassis 110 enters is provided below the wagon 500, as illustrated in FIG. 3. That is to say, the chassis 110 can enter the space S directly below the wagon 500. Note that when the wagon 500 is to be loaded on the chassis 110, the transport robot 100 moves in the −X direction and enters directly below the wagon 500. The chassis 110 enters directly below the wagon 500 from the side in the front-rear direction at which the stand 120 is not provided. Thus, the wagon 500 can be loaded without the stand 120 interfering with the wagon 500. In other words, the stand 120 is attached in the proximity of the corner of the chassis 110, so as not to interfere with the wagon 500.

While wagon 500 is illustrated as a dolly with wheels 502, the form and configuration of wagon 500 is not limited in particular. The wagon 500 accommodates transported articles 400 therein. The wagon 500 may have a cover 501 that is capable of being opened and closed. The transported articles 400 can be loaded and unloaded by a user opening the cover 501.

Lading operations of the wagon 500 will be described. When the chassis 110 enters the space S directly below the wagon 500, the lift mechanism 140 rises. Thus, a lift stage, which is the upper face of the lift mechanism 140, comes into contact with the wagon 500. The lift mechanism 140 can lift the wagon 500. That is to say, when the lift mechanism 140 rises, the wheels 502 are lifted off the floor surface, and the wagon 500 is loaded on the chassis 110.

When the wagon 500 is to be unloaded from the chassis 110, the lift mechanism 140 descends. The wheels 502 come into contact with the floor surface, and the upper face of the lift mechanism 140 is separated from the wagon 500. The wagon 500 is thus placed on the floor surface. The wagon 500 can be unloaded from the chassis 110 in this way. Note that the chassis 110 is provided with four wheels 111. The four wheels 111 are right and left front wheels, and right and left rear wheels. By independently controlling the rotation direction and rotation speed of the wheels 111, the transport robot 100 travels along a desired route. Part of the four wheels 111 may be driving wheels, and the rest may be driven wheels.

Shelf Mode

Next, a configuration in the shelf mode will be described with reference to FIGS. 5 to 7. The shelf portion 200 is provided upward from the chassis 110. The shelf portion 200 is attached to the chassis 110. Accordingly, the chassis 110 supports the shelf portion 200. The shelf portion 200 includes racks 210, a frame 220, and a base plate 240. The transport robot 100 can transfer transported articles 400 to and from an installed shelf 300 by passing the installed shelf 300 (FIGS. 8 to 10), which will be described later. That is to say, the transport robot 100 can receive a transported article 400 on the installed shelf 300 by passing the installed shelf 300. Alternatively, the transport robot 100 can transfer a transported article 400 from the shelf portion 200 to the installed shelf 300 by passing the installed shelf 300.

The rack 210 is a plate-like member provided along the XY plane. In FIGS. 5 to 7, the shelf portion 200 is provided with two racks 210. Transported articles 400 are placed on the racks 210. That is to say, the racks 210 support the transported articles 400. The two racks 210 are disposed at different heights. A transported article 400 is placed on each of the two racks 210. That is to say, the two racks 210 are separated in the Z direction by the height of the transported article 400 or more.

Although the two racks 210 are illustrated in FIGS. 5 to 7, the number of racks 210 is not limited in particular. The number of racks 210 may be one, or three or more. The racks 210 are disposed directly above the chassis 110. That is to say, the racks 210 are overlaid on the chassis 110 in XY plan view. The racks 210 are disposed upward from the lift mechanism 140. In the shelf mode, the transported articles 400 are transferred without the lift mechanism 140 operating.

The base plate 240 is a plate-like member provided along the XY plane. The base plate 240 is attached to the upper face of the lift mechanism 140. The base plate 240 is disposed on the −X side of the stand 120. The base plate 240 may be fixed to the chassis 110 using fixing device such as bolts, for example.

The frame 220 is attached to the base plate 240. The base plate 240 supports the frame 220. The frame 220 is attached to the base plate 240 at a position on the −Y side end portion of the base plate 240 (the first end portion side in the right-left direction of the transport robot 100). The frame 220 extends upward from the base plate 240. That is to say, the frame 220 is disposed upward from the right end portion of the chassis 110. The frame 220 is disposed on the −X side of the stand 120.

The frame 220 supports the racks 210. The frame 220 is attached to the chassis 110 on the outer side of the lift mechanism 140. The frame 220 extends upward on the outer side of the lift mechanism 140. The racks 210 extend to the +Y side (the second end portion side) from the frame 220. That is to say, the racks 210 are provided so as to protrude to the +Y side from the frame 220. The racks 210 have approximately the same size as the chassis 110 on the XY plane.

The shelf portion 200 transfers the transported articles 400 to and from the installed shelf 300. The installed shelf 300 is provided in the facility in which the transport robot 100 is used. The transported articles 400 that are placed on the installed shelf 300 are transferred to the shelf portion 200. Alternatively, the transported articles 400 placed on the shelf portion 200 are transferred to the installed shelf 300. The frame 220 is provided with transfer mechanisms 230 for transferring the transported articles 400. The transfer mechanisms 230 are rod-like members extending in the +Y direction.

As the transport robot 100 passes the installed shelf 300, the transported articles 400 are transferred. The transported articles 400 can be transferred between the shelf portion 200 and the installed shelf 300 without using an actuator for transferring. That is to say, there is no need to provide the installed shelf 300 or the transport robot 100 with a transferring robot arm. Fitting the transport robot 100 with the shelf portion 200 enables lading and unlading of the transported articles 400 to be performed easily and quickly. Also, when the transported article 400 are bulky, or when the number of transported articles 400 is great, the wagon 500 that has a larger transporting capacity than the shelf portion 200 can be used.

Figure 8:
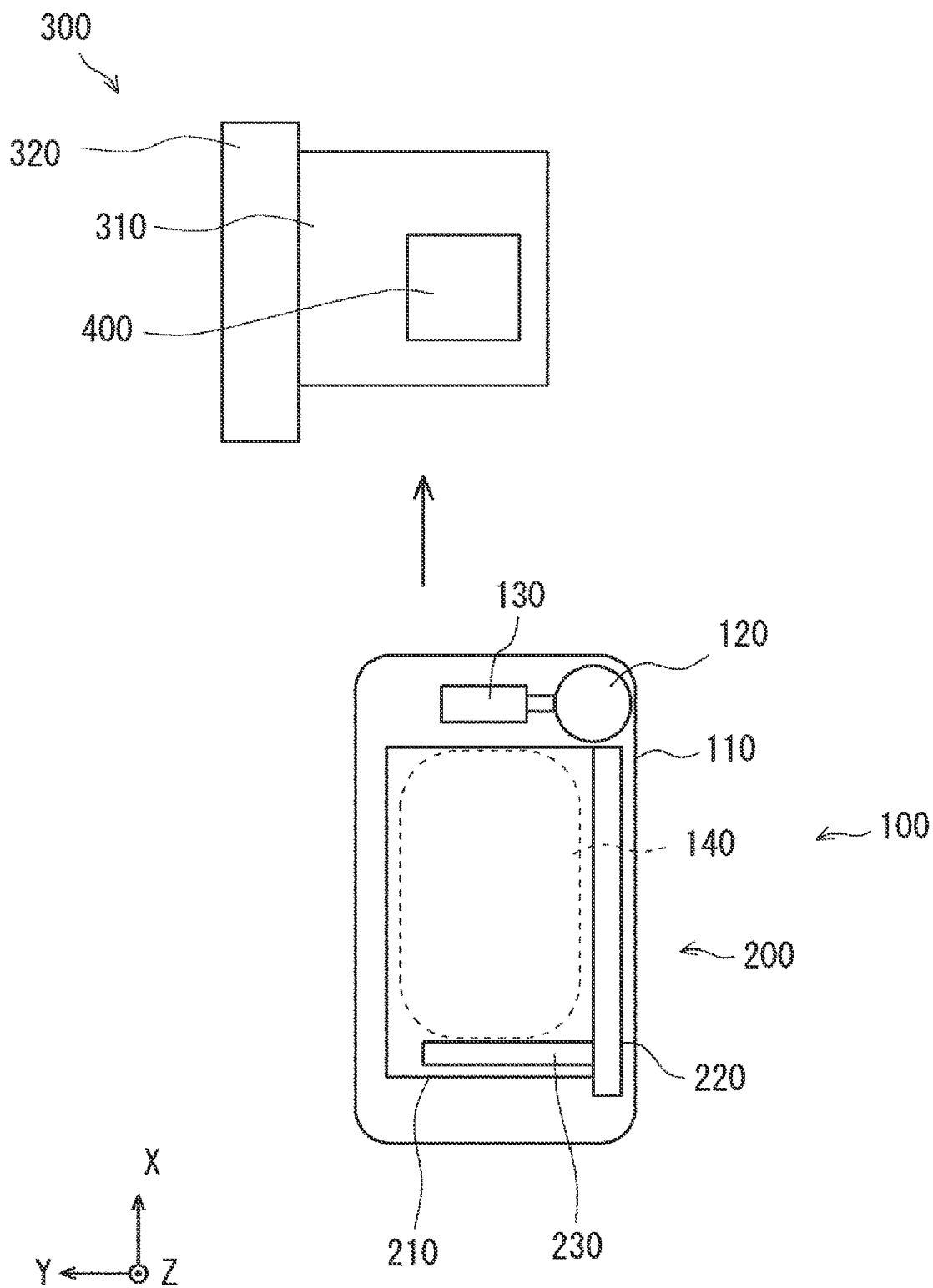
FIG. 8 is a top view for describing lading operations in a shelf portion mode.
Figure 9:
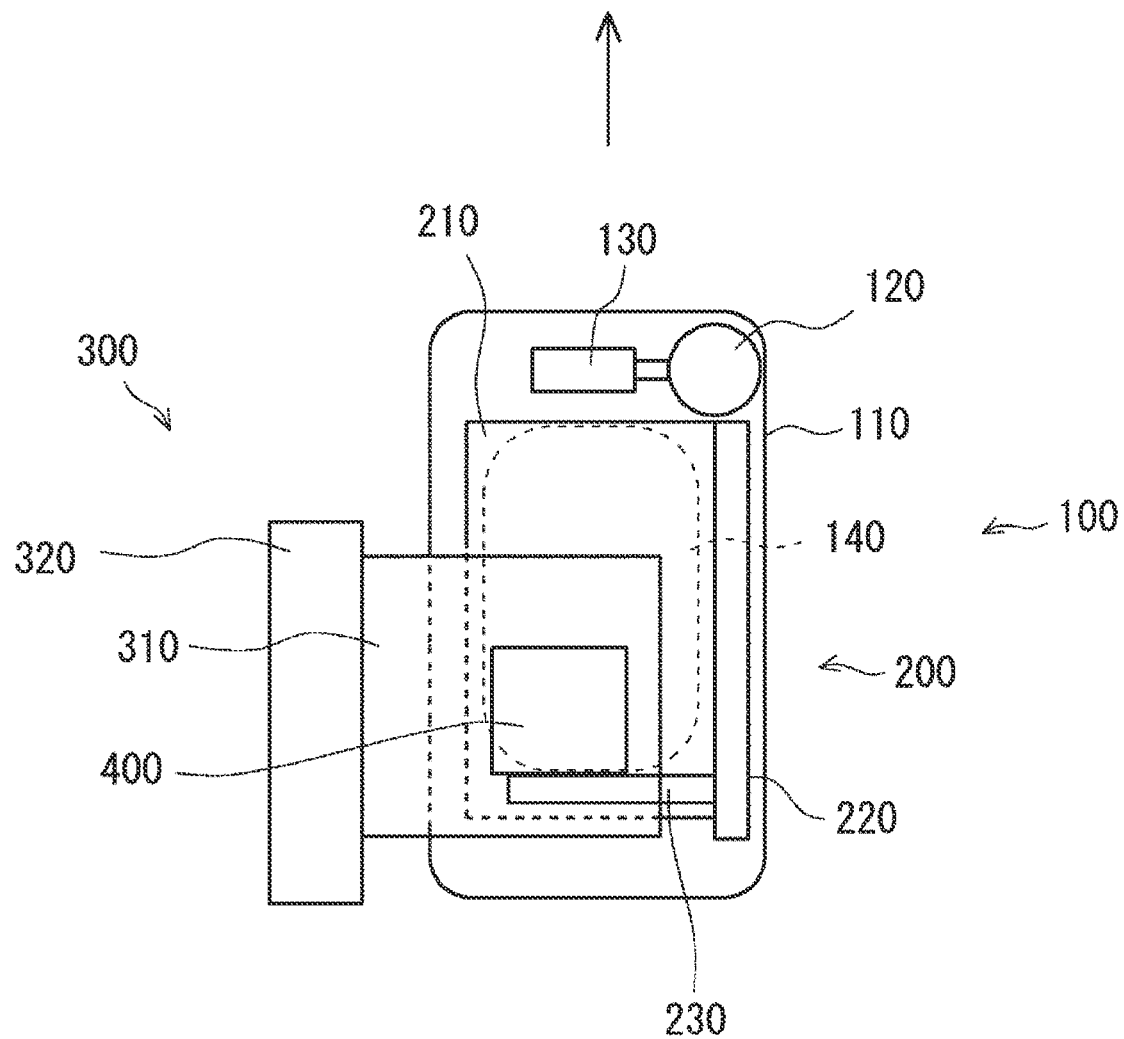
FIG. 9 is a top view for describing lading operations in the shelf portion mode.
Figure 10:
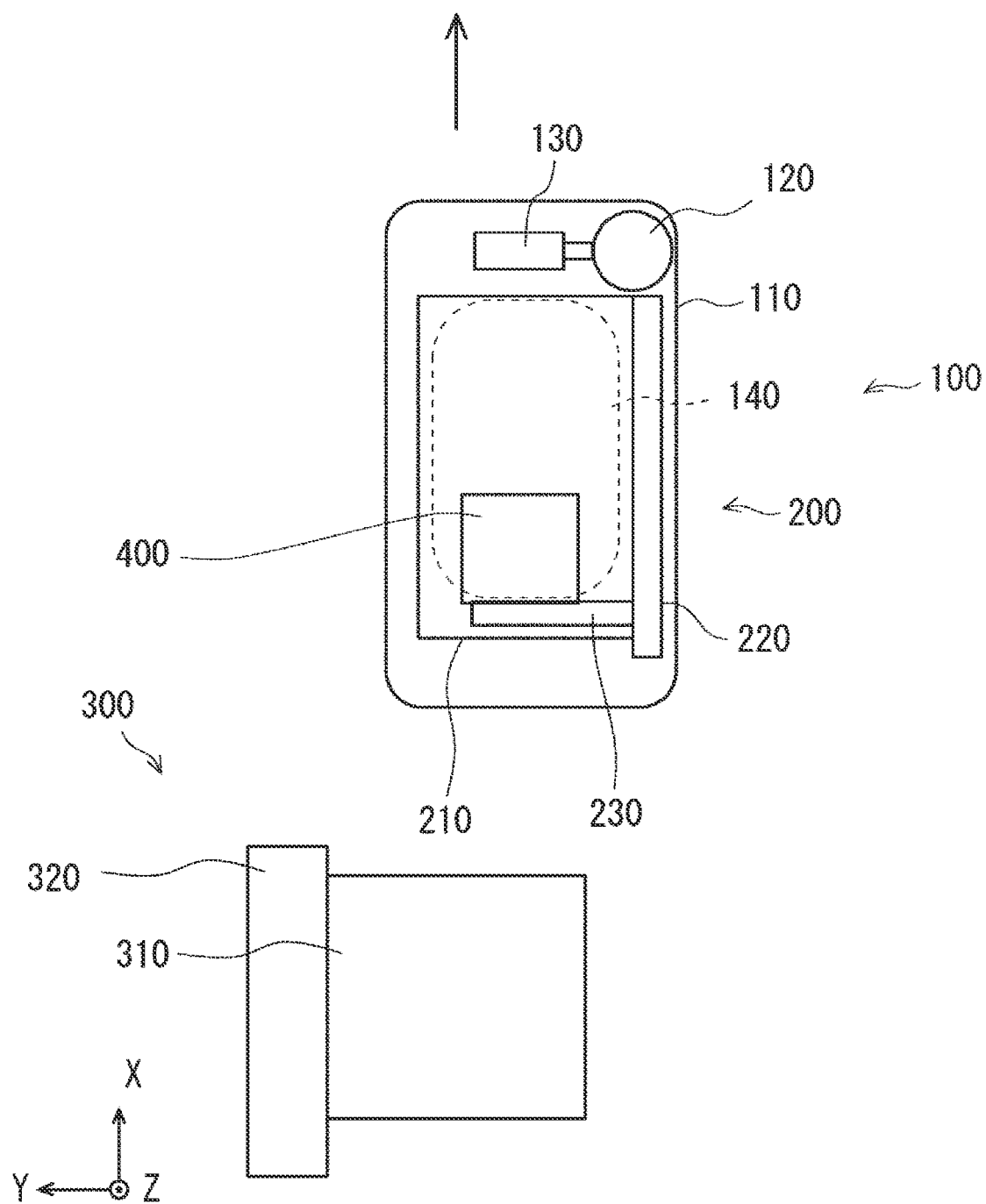
FIG. 10 is a top view for describing lading operations in the shelf portion mode.

Next, lading of transported articles 400 in the shelf mode will be described with reference to FIGS. 8 to 10. FIGS. 8 to 10 are top views for describing operations of the transport robot 100. FIGS. 8 to 10 are top views illustrating how a transported article 400 placed on the installed shelf 300 is transferred to the transport robot 100. Note that FIGS. 8 to 10 are schematic diagrams that are simplified as appropriate. FIG. 8 illustrates a state before transferring the transported article 400 to the shelf portion 200, and FIG. 9 illustrates a state at the time of transferring thereof. FIG. 10 illustrates a state after transferring thereof.

As the transport robot 100 passes the installed shelf 300, the transported article 400 is transferred from the installed shelf 300 to the shelf portion 200. The installed shelf 300 includes a rack 310 and a frame 320. The rack 310 has a height that is different from that of the rack 210 of the shelf portion 200. For example, the rack 210 is disposed at a position lower than the rack 310. Accordingly, the rack 210 passes under the rack 310. As the transport robot 100 travels, the shelf portion 200 passes the installed shelf 300. Note that the installed shelf 300 may have a plurality of racks 310.

The rack 310 is attached to the frame 320. The frame 320 supports the rack 310. The frame 320 is provided at the +Y side end portion of the rack 310. The rack 310 extends to the −Y side from the frame 320. The rack 310 protrudes to the −Y side from the frame 320. The rack 310 is disposed on the +Y side of the stand 120. In other words, the transport robot 100 travels along a path such that the stand 120 does not strike the installed shelf 300.

FIG. 8 illustrates a state before the transport robot 100 passes the installed shelf 300. In this case, the transported article 400 is placed on the rack 310. FIG. 9 illustrates the transport robot 100 in a state partway through passing the installed shelf 300. That is to say, FIG. 9 illustrates the transport robot 100 transferring the transported article 400. FIG. 10 illustrates the transport robot 100 in a state after having passed the installed shelf 300. Thus, FIG. 10 illustrates the transport robot 100 transporting the transported article 400.

Here, the transport robot 100 is traveling straight in the +X direction. In FIG. 8, the installed shelf 300 is ahead of the transport robot 100. That is to say, in FIG. 8, the transport robot 100 is on the −X side of the transported article 400. In FIG. 9, the installed shelf 300 overlaps the transport robot 100 in XY plan view. That is to say, in FIG. 9, the transport robot 100 and the transported article 400 are at the same position on the XY plane. In FIG. 10, the installed shelf 300 is rearward in the direction of travel of the transport robot 100. That is to say, in FIG. 10, the transport robot 100 is traveling on the +X side of the transported article 400.

The shelf portion 200 is provided with the transfer mechanisms 230 for receiving the transported articles 400. When the transport robot 100 moves in the +X direction from the state illustrated in FIG. 8, this results in the configuration illustrated in FIG. 9. In the configuration illustrated in FIG. 9, for example, the transfer mechanism 230 comes into contact with the transported article 400. Transfer of the transported article 400 is performed by the transfer mechanism 230 coming into contact with the transported article 400. Note that the transfer mechanism 230 may come into contact with the shelf portion 200 instead of the transported article 400. Alternatively, the transfer mechanisms 230 may be provided on the installed shelf 300. Detailed description of the transfer mechanism 230 will be omitted.

When the transport robot 100 travels in the +X direction from the state illustrated in FIG. 9, this results in the configuration illustrated in FIG. 10. In FIG. 10, the transported article 400 is placed on the shelf portion 200. For example, when the transport robot 100 travels while the transfer mechanism 230 is in contact with the transported article 400, the transported article 400 moves. As the transport robot 100 travels, the transported article 400 also moves. As a result of the transport robot 100 travelling, the transported article 400 is pushed off from the rack 310. When the transport robot 100 passes the installed shelf 300, the transported article 400 is pushed off from the rack 310, and the transported article 400 is transferred from upon the rack 310 onto the rack 210.

In this way, the transport robot 100 that is in the shelf mode can transfer the transported article 400 on the rack 310 onto the rack 210 by passing the installed shelf 300. That is to say, transferring the transported article 400 can be performed by the transport robot 100 traveling. This does away with the need for an arm mechanism or the like for transferring transported articles. Accordingly, the transported article 400 can be transferred by a simple configuration.

The stand 120 that supports the operating unit 130 extends upward from the chassis 110. The stand 120 is disposed on the first end portion side of the transport robot 100 in the right-left direction. The stand 120 is disposed offset from the middle in the right-left direction to either of the right or left side. By doing so, the transport robot 100 can pass the installed shelf 300 without the stand 120 coming into contact with the installed shelf 300. The transported articles 400 can be transferred without the stand 120 interfering.

In a case in which the stand 120 is installed at the middle in the right-left direction, for example, the stand 120 will strike the installed shelf 300 when the transport robot 100 passes the installed shelf 300. In order to keep the stand 120 from coming into contact with the installed shelf 300 in such an arrangement, the size of the shelf portion 200 in the right-left direction would have to be reduced. Accordingly, transporting large-sized transported articles 400 would be difficult.

In contrast, in the transport robot 100 according to the present embodiment, the size of the shelf portion 200 is approximately the same size as that of the chassis 110 in the right-left direction. That is to say, almost the entire space directly above the chassis 110 can be used as loading space. Accordingly, the loading capacity of the transported article 400 can be increased, and thus efficient transporting can be realized.

As described above, the stand 120 protrudes upward from the right end portion of the chassis 110. Of course, the position of disposing the stand 120 may be reversed between right and left. For example, the stand 120 may extend upward from a left end portion of the chassis 110. In this case, the disposing position relationship between the installed shelf 300 and the shelf portion 200 will be reversed between right and left. It is sufficient for the stand 120 to be disposed on the first end portion side or the second end portion side of the chassis 110 in the right-left direction and extend upward from the chassis 110.

According to the present embodiment, the shelf portion 200 can pass the installed shelf 300 without the stand 120 coming into contact with the installed shelf 300. The stand 120 does not interfere with transferring, thus enabling simple transferring. Furthermore, the entire space above the chassis 110 can be used as loading space, and accordingly the loading capacity can be increased. Thus, the transporting efficiency can be improved.

The touch panel monitor, which is the operating unit 130, is attached to the stand 120 so as to extend from the stand 120 toward the left end portion side (second end portion side). Accordingly, the operating unit 130 is disposed at the middle of the chassis 110 in the right-left direction. For example, the operating unit 130 is disposed at the middle in the right-left direction, at the front end or the rear end of the transport robot 100 in the direction of travel. Thus, the transport robot 100 can travel without the operating unit 130 interfering. Of course, when the stand 120 is provided at the left end, the operating unit 130 extends to the right side.

The stand 120 is disposed at the first end portion in the right-left direction of the chassis 110, and the operating unit 130 extends from the stand 120 toward the second end portion in the right-left direction. Thus, the operating unit 130 can be operated while the user is standing at the middle of the transport robot 100 in the right-left direction. Accordingly, operability can be improved.

Note that while description has been made above regarding the operation of transferring the transported article 400 from the installed shelf 300 to the shelf portion 200, the operation of transferring the transported article 400 from the shelf portion 200 to the installed shelf 300 is similar thereto. That is to say, when transferring the transported article 400 on the shelf portion 200 to the installed shelf 300, all that is necessary is for the transport robot 100 to pass the installed shelf 300. Accordingly, detailed description will be omitted.

Note that the present disclosure is not limited to the above embodiment, and can be appropriately modified.

What is claimed is:

1. A transport robot configured to transfer a transported article to and from an installed shelf that is independent from the transport robot through the transport robot passing the installed shelf, the transport robot comprising:
    a shelf portion that is configured to hold the transported article and that is configured to pass by the installed shelf by the transport robot traveling so to move the transported article from the installed shelf to the shelf portion;
    a chassis configured to support the shelf portion;
    a stand that is disposed on a first end portion side in a right-left direction of the transport robot and that extends upward from the chassis; and
    an operating unit configured to be installed on the stand.

2. The transport robot according to claim 1, wherein:
    the chassis is provided with a lift stage that is configured to ascend and descend; and
    the stand is disposed on an outer side from the lift stage.

3. The transport robot according to claim 2, wherein:
    the operating unit is a touch panel monitor attached to the stand; and
    the touch panel monitor extends from the stand toward a second end portion side of the transport robot in the right-left direction.

4. The transport robot according to claim 3, wherein the touch panel monitor receives transporting information about the transported article, and displays content about a transported article being transported, content about a transported article scheduled to be transported, or information about a destination to which a transported article is to be transported.

5. The transport robot according to claim 2, wherein the shelf portion is configured to be detachable from the chassis.

6. The transport robot according to claim 5, wherein an upper face of the lift stage is configured to serve as a placing face on which a wagon is placed, when in a state in which the shelf portion is removed from the chassis.

7. The transport robot according to claim 1, wherein:
    the shelf portion includes a base plate, a frame, and a rack;
    the base plate is configured to be detachably fixed to the chassis;
    the frame is disposed on the first end portion side in the right-left direction of the transport robot, and extends upward from the base plate; and
    the rack is supported by the frame and extends from the frame toward a second end portion side of the transport robot in the right-left direction.

8. The transport robot according to claim 7, wherein a plurality of racks is provided, the plurality of racks are disposed at different heights and the transported article is placed on one rack of the plurality of racks.

9. The transport robot according to claim 1, further comprising a transfer mechanism provided to the shelf portion, wherein:
    the transfer mechanism is a rod member extending in the right-left direction of the transport robot; and
    when the transport robot passes the installed shelf, the transfer mechanism is configured to be brought into contact with the transported article such that the transported article is transferred between the transport robot and the installed shelf.

10. The transport robot according to claim 9, wherein a size of the shelf portion is the same as a size of the chassis in the right-left direction.

11. A system for transferring a transported article, the system comprising:
    an installed shelf;
    a transport robot independent from the installed shelf, the transport robot configured to transfer the transported article to and from the installed shelf through the transport robot passing the installed shelf, the transport robot comprising:
    a shelf portion that is configured to hold the transported article and that is configured to pass by the installed shelf by the transport robot traveling so to move the transported article from the installed shelf to the shelf portion;
    a chassis configured to support the shelf portion;
    a stand that is disposed on a first end portion side in a right-left direction of the transport robot and that extends upward from the chassis; and
    an operating unit configured to be installed on the stand.

12. The system according to claim 11, wherein:
    the chassis is provided with a lift stage that is configured to ascend and descend; and
    the stand is disposed on an outer side from the lift stage.

13. The system according to claim 12, wherein:
    the operating unit is a touch panel monitor attached to the stand; and
    the touch panel monitor extends from the stand toward a second end portion side of the transport robot in the right-left direction.

14. The system according to claim 13, wherein the touch panel monitor receives transporting information about the transported article, and displays content about a transported article being transported, content about a transported article scheduled to be transported, or information about a destination to which a transported article is to be transported.

15. System according to claim 12, wherein the shelf portion is configured to be detachable from the chassis.

16. System according to claim 15, wherein an upper face of the lift stage is configured to serve as a placing face on which a wagon is placed, when in a state in which the shelf portion is removed from the chassis.

17. The system according to claim 11, wherein:
    the shelf portion includes a base plate, a frame, and a rack;
    the base plate is configured to be detachably fixed to the chassis;
    the frame is disposed on the first end portion side in the right-left direction of the transport robot, and extends upward from the base plate; and
    the rack is supported by the frame and extends from the frame toward a second end portion side of the transport robot in the right-left direction.

18. The system according to claim 17, wherein a plurality of racks is provided, the plurality of racks are disposed at different heights and the transported article is placed on one rack of the plurality of racks.

19. The system according to claim 11, further comprising a transfer mechanism provided to the shelf portion, wherein:
    the transfer mechanism is a rod member extending in the right-left direction of the transport robot; and
    when the transport robot passes the installed shelf, the transfer mechanism is configured to be brought into contact with the transported article such that the transported article is transferred between the transport robot and the installed shelf.

20. The system according to claim 19, wherein a size of the shelf portion is the same as a size of the chassis in the right-left direction.

\* \* \* \* \*